US008098931B2

United States Patent
Chen

(10) Patent No.: US 8,098,931 B2
(45) Date of Patent: Jan. 17, 2012

(54) METHOD FOR ADAPTIVELY SELECTING FILTERS TO INTERPOLATE VIDEO DATA

(75) Inventor: Ying-Ru Chen, Tainan County (TW)

(73) Assignee: Himax Technologies Limited, Tainan (TW)

( * ) Notice: Subject to any disclaimer, the term of this patent is extended or adjusted under 35 U.S.C. 154(b) by 678 days.

(21) Appl. No.: 12/330,835

(22) Filed: Dec. 9, 2008

(65) Prior Publication Data

US 2010/0142843 A1   Jun. 10, 2010

(51) Int. Cl.
G06K 9/00 (2006.01)
G06K 9/36 (2006.01)
G06K 9/40 (2006.01)
H04N 11/20 (2006.01)
H04N 7/01 (2006.01)
H04N 9/64 (2006.01)
H04N 11/02 (2006.01)
H04N 11/04 (2006.01)
H04N 7/12 (2006.01)

(52) U.S. Cl. ........ 382/166; 382/232; 382/260; 348/441; 348/708; 375/240.02

(58) Field of Classification Search ............... None
See application file for complete search history.

(56) References Cited

U.S. PATENT DOCUMENTS

| 6,734,921 B1 * | 5/2004 | McIntyre et al. ............. 348/708 |
| 7,016,531 B1 * | 3/2006 | Murching et al. ............ 382/164 |
| 7,088,398 B1 * | 8/2006 | Wolf et al. ................. 348/423.1 |
| 2004/0105029 A1 * | 6/2004 | Law et al. ..................... 348/448 |
| 2005/0063586 A1 * | 3/2005 | Munsil et al. ................. 382/162 |
| 2005/0163388 A1 * | 7/2005 | Schwartz et al. ............. 382/232 |
| 2006/0007353 A1 * | 1/2006 | Matsutani et al. ............ 348/441 |
| 2006/0147110 A1 * | 7/2006 | Munsil ........................... 382/162 |
| 2006/0262223 A1 * | 11/2006 | Lee et al. ...................... 348/581 |
| 2009/0115908 A1 * | 5/2009 | Walls ............................. 348/699 |
| 2010/0046612 A1 * | 2/2010 | Sun et al. ................. 375/240.02 |
| 2011/0075035 A1 * | 3/2011 | MacInnis et al. ............. 348/584 |

* cited by examiner

Primary Examiner — Randolph I Chu
(74) Attorney, Agent, or Firm — J.C. Patents

(57) ABSTRACT

A method for adaptively selecting filters to interpolate video data is provided. In the present method, when receiving video data encoded by a 4:2:2 sampling format, a plurality of filters having different weights are adaptively selected to convert the color components in the video data to a 4:4:4 sampling format based on the differences of luminance and color components among a target pixel and neighboring pixels thereof. Accordingly, the blurs occurred in an area with large color variation can be removed or reduced, such that the interpolated color components can be accepted by human eyes more easily.

12 Claims, 3 Drawing Sheets

METHOD FOR ADAPTIVELY SELECTING FILTERS TO INTERPOLATE VIDEO DATA

BACKGROUND OF THE INVENTION

1. Field of the Invention

The present invention generally relates to a upsample method, and more particularly, to a method for adaptively selecting filters to interpolate video data.

2. Description of Related Art

With continuing progress and improvement on electronic technology, compact-sized electronic devices such as cellular phones and personal digital assistants (PDAs), have continuously progressed. In current market, electronic devices are integrated with multiple functions so as to enhance their competitiveness. Besides functions of photographing, telephoning and internet surfing, multimedia playback has also become required function of the electronic devices.

In order to provide high performance on multimedia playback, a small System-on-a-Chip (SoC) is disposed in the electronic devices. In the SoC, an audio receiver, an analog-to-digital converter (ADC), a microprocessor, a memory, and an input/output logic are integrated in a single integrated circuit (IC) chip. The Soc is used to encode the multimedia file into standard compression formats such as H.261, H.263, MPEG-1, MPEG-2, and MPEG-4 and also used to interpolate the compressed data when there is a need to play the multimedia file.

When performing video encoding, in order to reduce the amount of data to be processed, the color components of video data is usually transformed from RGB into others. Based on the characteristic of human eyes that is insensitive to color components, the color components of the video data is usually sub-sampled such that only a portion of color information is retained. The common sub-sampling formats includes a 4:2:2 sampling format, a 4:1:1 sampling format, and a 4:2:0 sampling format.

For example, in the process of 4:2:2 sub-sampling for pixels containing color components of R, G, and B, the color components of R, G, and B are equivalently transformed into a luminance Y and color components U and V, and the color components of the pixels are sampled by two. That is, for each two pixels, only the color components of one pixel is sampled and used as the color components of the two pixels.

However, when performing video decoding, no matter what kind of sampling format is used, the sub-sampled color components of video data have to be recovered back to a 4:4:4 sampling format. For example, video data in a 4:2:2 sub-sampling format can be recovered back to the one in the 4:4:4 sub-sampling format by using an averaging filter. To be specific, a pixel on the left and a pixel on the right of a target pixel to be interpolated are averaged and the average value is used as the value of the target pixel. The averaging filter may be suitable for decoding pixels in a smooth area of the video data, but for the pixels in an area having great variation in color components, color blurs may occur by using a single averaging filter. Accordingly, it is necessary to find appropriate filters to be used for decoding the color components of the video data based on the variation in the color components of the video data, so as to remove or reduce the blurs.

SUMMARY OF THE INVENTION

In light of the above, the present invention provides a method for adaptively selecting filters to interpolate video data, in which multiple filters are adaptively selected for decoding the video data according to the variation of luminance or color components of the video data.

In order to achieve the above-mentioned or other objects, the present invention provides a method for adaptively selecting filters to interpolate video data, in which the video data encoded by a 4:2:2 sampling format is received and filters are adaptively selected to convert the color components in the video data to a 4:4:4 sampling format based on differences of luminance and color components among a pixel P, a pixel P_1 on the left of the pixel P, a pixel P_2 on the left of the pixel P_1, a pixel P_3 on the left of the pixel P_2, a pixel P1 on the right of the pixel P, a pixel P2 on the right of the pixel P1, and a pixel P3 on the right of the pixel P2 in the video data.

In the filter selecting step, whether a difference between the color components of the pixels P1 and P_1 is larger than a first threshold is determined. If larger than the first threshold, whether a difference between the luminances of the pixels P and P1 or P and P_1 is smaller than a second threshold is determined, in which if smaller than the second threshold, a full left enhancing filter or a full right enhancing filter is used to convert the video data, and otherwise a center-to-left enhancing filter or a center-to-right enhancing filter is used to convert the video data.

On the other hand, if not larger than the first threshold, whether a difference between the luminances of the pixels P and P_1 or the pixels P and P1 is larger than a third threshold is determined. If larger than the third threshold, whether a difference between a variation of the luminances among pixels P_2 to P and a variation of the luminances among pixels P to P2 is larger than a forth threshold is determined, in which if larger than the forth threshold, the center-to-left enhancing filter or the center-to-right enhancing filter is used to convert the video data, and otherwise a center-to-left loosing filter or a center-to-right loosing filter is used to convert the video data. Moreover, if the difference between the luminances of the pixels P and P_1 or the pixels P and P1 is not larger than the third threshold, a central averaging filter is used to convert the video.

According to an embodiment of the present invention, in the step of using the full left enhancing filter or the full right enhancing filter to convert the video data, if the differences between each two of the pixels P_3, P_2, P_1, and P are all smaller than a fifth threshold, the full left enhancing filter is used to convert the video data, and if the differences between each two of the pixels P, P1, P2, and P3 are all smaller than the fifth threshold, the full right enhancing filter is used to convert the video data.

According to an embodiment of the present invention, in the step of using the center-to-left enhancing filter or the center-to-right enhancing filter to convert the video data, if a variation of the luminances among the pixels P_2 to P is smaller than a variation of the luminances among the pixels P to P2, the center-to-left enhancing filter is used to convert the video data, and if a variation of the luminance component among pixels P2 to P is smaller than a variation of the luminance component among the pixels P_2 to P, the center-to-right enhancing filter is used to convert the video data.

According to an embodiment of the present invention, in the step of using a center-to-left loosing filter or a center-to-right loosing filter to convert the video data, if a variation of the luminances among the pixels P_1 to P is smaller than a variation of the luminances among the pixels P1 to P, the center-to-left loosing filter is used to convert the video data, and if a variation of the luminances among the pixels P1 to P is smaller than a variation of the luminances among the pixels P_1 to P, the center-to-right loosing filter is used to convert the video data.

According to an embodiment of the present invention, in the step of converting the video data from the 4:2:2 sampling format to the 4:4:4 sampling format, a summation of the pixels P_3, P_1, P1, P3 that are respectively multiplied by a corresponding weight of the filter is calculated and divided by a summation of the weights so as to obtain the color component of the pixel P.

According to an embodiment of the present invention, the weights of the full left enhancing filter corresponding to the pixels P_3, P_1, P1, P3 are 1, 7, 0, 0, respectively.

According to an embodiment of the present invention, the weights of the full right enhancing filter corresponding to the pixels P_3, P_1, P1, P3 are 0, 0, 7, 1, respectively.

According to an embodiment of the present invention, the weights of the center-to-left enhancing filter corresponding to the pixels P_3, P_1, P1, P3 are 0, 7, 1, 0, respectively.

According to an embodiment of the present invention, the weights of the center-to-right enhancing filter corresponding to the pixels P_3, P_1, P1, P3 are 0, 1, 7, 0, respectively.

According to an embodiment of the present invention, the weights of the center-to-left loosing filter corresponding to the pixels P_3, P_1, P1, P3 are 0, 3, 1, 0, respectively.

According to an embodiment of the present invention, the weights of the center-to-right loosing filter corresponding to the pixels P_3, P_1, P1, P3 are 0, 1, 3, 0, respectively.

According to an embodiment of the present invention, the weights of the central averaging filter corresponding to the pixels P_3, P_1, P1, P3 are 0, 1, 1, 0, respectively.

In the present invention, a full left enhancing filter, a full right enhancing filter, a center-to-left enhancing filter, a center-to-right enhancing filter, a center-to-left loosing filter, a center-to-right loosing filter, and an averaging filter are adaptively selected for upsampling the video data in an area with different edge strengths. Accordingly, the blurs on the color components of video data can be removed or reduced.

In order to make the aforementioned and other objects, features, and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
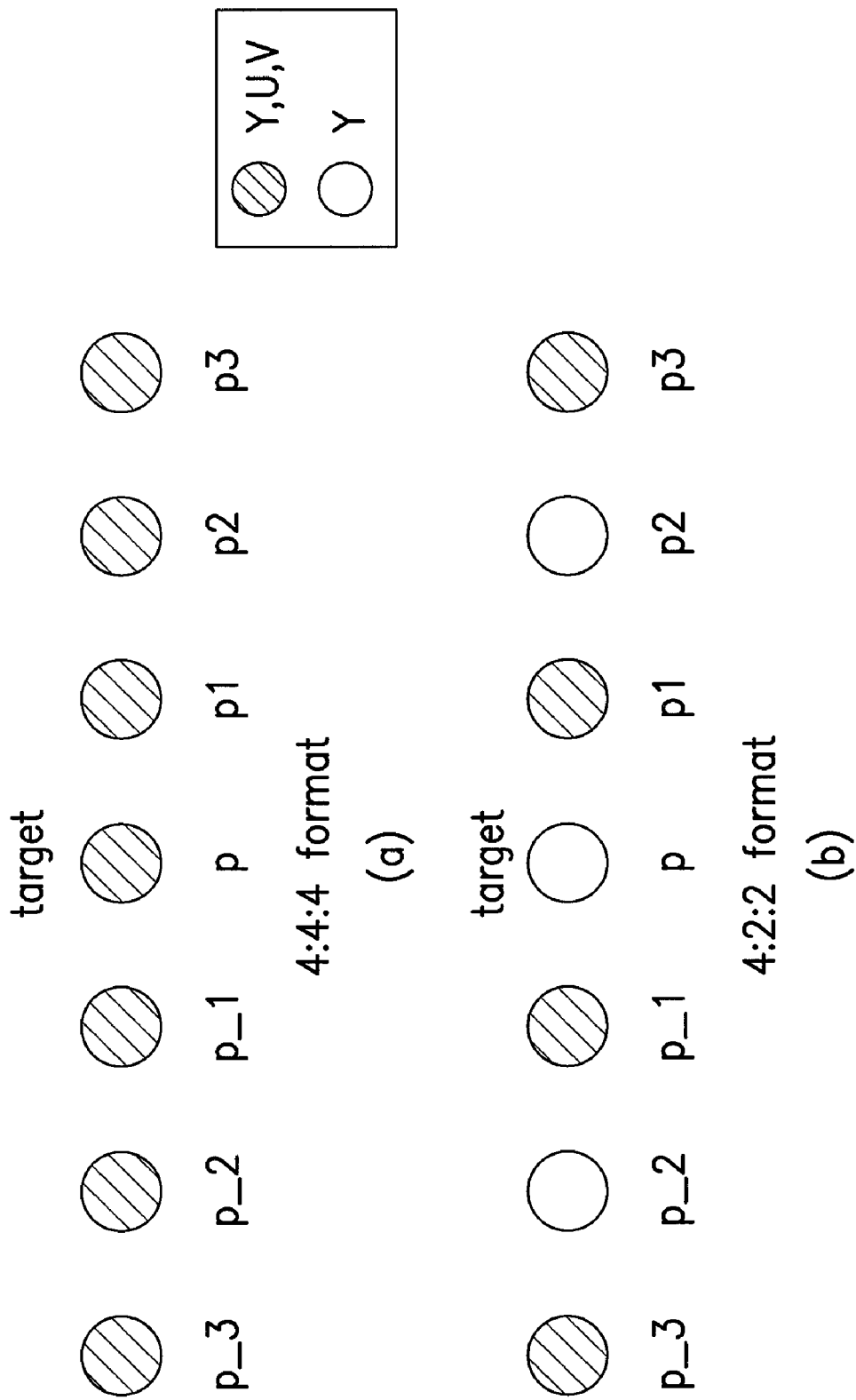
FIG. 1(a) and FIG. 1(b) are schematic diagrams illustrating neighboring pixels to be used by up-sampling filters according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present provides multiple filters with various weights and uses these filters to upsample video data by multiplying the weights with the neighboring pixels of each target pixel to be interpolated, in which a range of the neighboring pixels used to interpolate the value of the target pixel is enlarged from one pixel distance away from the target pixel up to three pixels away from the target pixel. Accordingly, even if the color components strongly change in a specific area, the color blurs occurred therefrom can be reduced, so as to obtain better recovered video data. In order to make the present invention more comprehensible, embodiments are described below as the examples to prove that the invention can actually be realized.

FIG. 1(a) and FIG. 1(b) are schematic diagrams illustrating neighboring pixels to be used by up-sampling filters according to one embodiment of the present invention. For video data in a 4:4:4 sampling format, each pixel contains values of luminance Y and color components U and V as shown in FIG. 1(a), and for video data in a 4:2:2 sampling format, each pixel contains value of luminance Y, but every two neighboring pixels contain only one set of color components U and V. Accordingly, the present embodiment adopts up to seven filters for decoding video data, in which each filter contains weights corresponding to the neighboring pixels of a target pixel P, including a pixel P_1 on the left of the pixel P, a pixel P_2 on the left of the pixel P_1, a pixel P_3 on the left of the pixel P_2, a pixel P1 on the right of the pixel P, a pixel P2 on the right of the pixel P1, and a pixel P3 on the right of the pixel P2 in the video data. The filters and weights thereof are listed below:

Full left enhancing filter: [1, 7, 0, 0]/8
Full right enhancing filter: [0, 0, 7, 1]/8
Center-to-left enhancing filter: [0, 7, 1, 0]/8
Center-to-right enhancing filter: [0, 1, 7, 0]/8
Center-to-left loosing filter: [0, 3, 1, 0]/4
Center-to-right loosing filter: [0, 1, 3, 0]/4
Central averaging filter: [0, 1, 1, 0]/2

To be specific, the weights of the full left enhancing filter corresponding to the pixels P_3, P_1, P1, P3 are 1, 7, 0, 0, respectively. The weights of the full right enhancing filter corresponding to the pixels P_3, P_1, P1, P3 are 0, 0, 7, 1, respectively. That means the weights of the full left enhancing filter and the full right enhancing filter are fully acted on neighboring pixels on one side such that the value of the target pixel has no relation to the neighboring pixels on the other side.

Moreover, the weights of the center-to-left enhancing filter corresponding to the pixels P_3, P_1, P1, P3 are 0, 7, 1, 0, respectively. The weights of the center-to-right enhancing filter corresponding to the pixels P_3, P_1, P1, P3 are 0, 1, 7, 0, respectively. The weights of the center-to-left enhancing filter and the center-to-right enhancing filter are acted partially on neighboring pixels of both sides, but greatly weighted on neighboring pixels of one side.

The weights of the center-to-left loosing filter corresponding to the pixels P_3, P_1, P1, P3 are 0, 3, 1, 0, respectively. The weights of the center-to-right loosing filter corresponding to the pixels P_3, P_1, P1, P3 are 0, 1, 3, 0, respectively. The weights of the center-to-left loosing filter and the center-to-right loosing filter are also acted partially on neighboring pixels of both sides, but weighted on neighboring pixels of one side less than the weights of center-to-left enhancing filter and the center-to-right enhancing filter.

The weights of the central averaging filter corresponding to the pixels P_3, P_1, P1, P3 are 0, 1, 1, 0, respectively. The weights of the central averaging filter are acted partially and equally on neighboring pixels of both sides.

Figure 2:
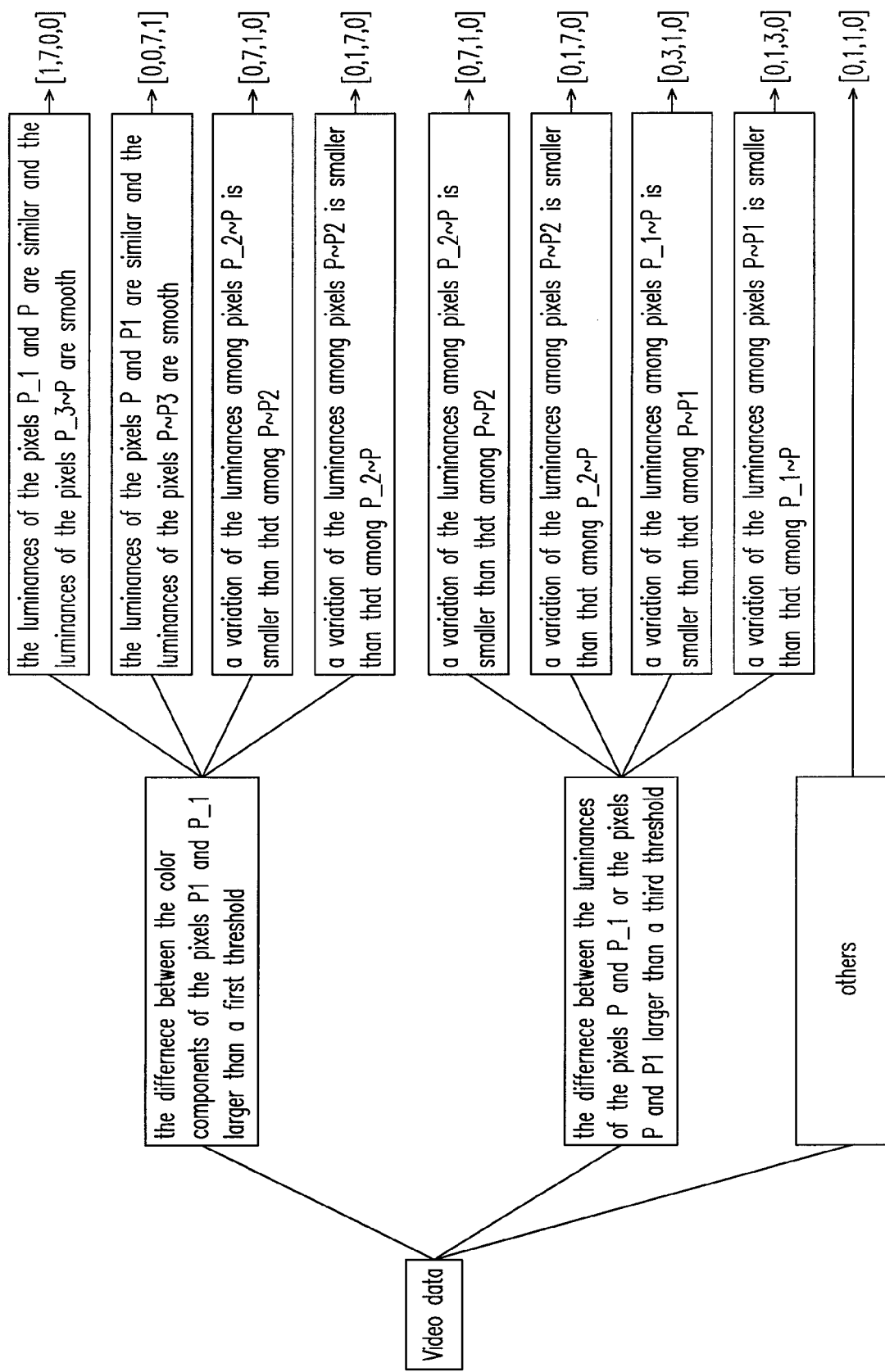
FIG. 2 is a schematic diagram illustrating the filters adaptively selected to interpolate video data according to one embodiment of the present invention.

FIG. 2 is a schematic diagram illustrating the filters adaptively selected to interpolate video data according to one embodiment of the present invention. Referring to FIG. 2, as for decoding video data (200), a difference between the color components of the pixels P and P_1 is calculated first and determined whether larger than a first threshold (210). If the difference is larger than the first threshold, the flow is proceeds to states 212, 214, 216, and 218.

In state 212, it is determined that the luminances of the pixels P_1 and P are similar and the luminances of the pixels P_3 to P are smooth. Accordingly, the full left enhancing filter with weights [1, 7, 0, 0] corresponding to the pixels P_3, P_1, P1, P3 is used to interpolate the target pixel.

In state 214, it is determined that the luminances of the pixels P and P1 are similar and the luminances of the pixels P to P3 are smooth. Accordingly, the full right enhancing filter with weights [0, 0, 7, 1] corresponding to the pixels P_3, P_1, P1, P3 is used to interpolate the target pixel.

In state 216, it is determined that a variation of the luminances among the pixels P_2 to P is smaller than that among the pixels P to P2. Accordingly, the center-to-left enhancing filter with weights [0, 7, 1, 0] corresponding to the pixels P_3, P_1, P1, P3 is used to interpolate the target pixel.

In state 218, it is determined that a variation of the luminances among the pixels P to P2 is smaller than that among the pixels P_2 to P. Accordingly, the center-to-right enhancing filter with weights [0, 1, 7, 0] corresponding to the pixels P_3, P_1, P1, P3 is used to interpolate the target pixel.

Besides calculating the difference between the color components of the pixels P and P_1, a difference between the luminances of the pixels P and P_1 or the pixels P and P1 is further calculated and determined whether larger than a third threshold (220). If the difference is larger than the third threshold, the flow is proceeded to states 222, 224, 226, and 228.

In state 222, it is determined that a variation of the luminances among the pixels P_2 to P is smaller than that among the pixels P to P2. Accordingly, the center-to-left enhancing filter with weights [0, 7, 1, 0] corresponding to the pixels P_3, P_1, P1, P3 is used to interpolate the target pixel.

In state 224, it is determined that a variation of the luminances among the pixels P to P2 is smaller than that among the pixels P_2 to P. Accordingly, the center-to-right enhancing filter with weights [0, 1, 7, 0] corresponding to the pixels P_3, P_1, P1, P3 is used to interpolate the target pixel.

In state 226, it is determined that a variation of the luminances among the pixels P_1 to P is smaller than that among the pixels P to P1. Accordingly, the center-to-left loosing filter with weights [0, 3, 1, 0] corresponding to the pixels P_3, P_1, P1, P3 is used to interpolate the target pixel.

In state 228, it is determined that a variation of the luminances among the pixels P to P1 is smaller than that among the pixels P_1 to P. Accordingly, the center-to-right loosing filter with weights [0, 1, 3, 0] corresponding to the pixels P_3, P_1, P1, P3 is used to interpolate the target pixel.

Finally, for the states other than those as described above, the central averaging filter with weights [0, 1, 1, 0] corresponding to the pixels P_3, P_1, P1, P3 is used to interpolate the target pixel.

Figure 3:
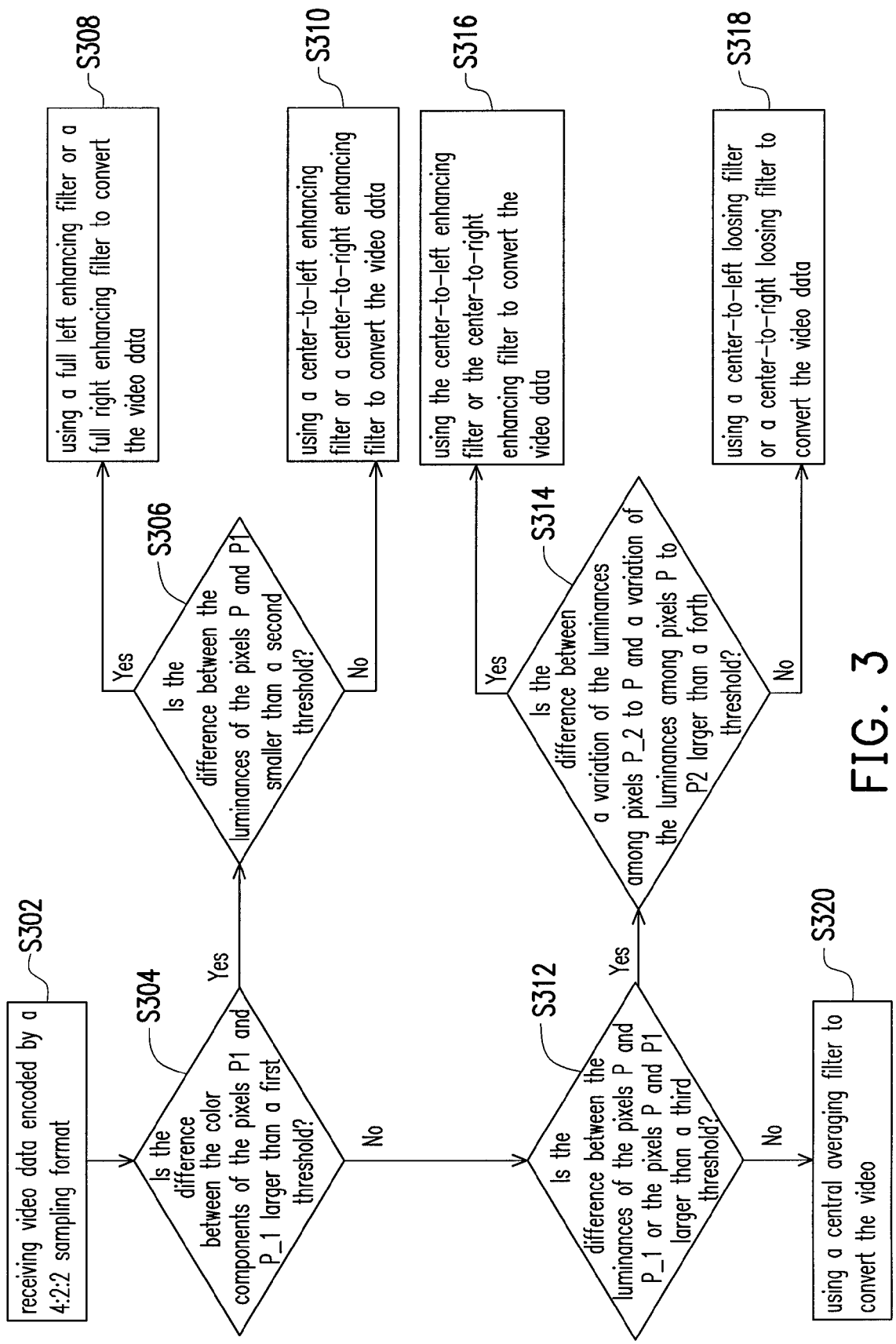
FIG. 3 is a flowchart illustrating a method for adaptively selecting filters to interpolate video data according to one embodiment of the present invention.

Based on the above mentioned structure of filter selection, a corresponding flow is concluded and described in a following embodiment. FIG. 3 is a flowchart illustrating a method for adaptively selecting filters to interpolate video data according to one embodiment of the present invention. Referring to FIG. 3, the present embodiment adopts the seven filters previously defined in the former embodiment to interpolate video data in a 4:2:2 sampling format to a 4:4:4 sampling format. The steps of the selecting method are as follows.

First, video data encoded by a 4:2:2 sampling format is received (S302). Then, a plurality of filters are adaptively selected to interpolate the color components of a target pixel P in the video data to a 4:4:4 sampling format based on differences of luminance and color components among the neighboring pixels P_3, P_1, P1, P3 of the target pixel P in the video data. To be specific, when decoding the video data from the 4:2:2 sampling format to the 4:4:4 sampling format, the pixels P_3, P_1, P1, P3 are respectively multiplied by a corresponding weight of the filter, summed together, and then divided by a summation of the weights, so as to obtain the color components of the pixel P.

In detail, a difference between the color components of the pixels P and P_1 is calculated and whether the difference is larger than a first threshold is determined (S304). If the difference is determined larger than the first threshold, it is concluded that the pixels P and P_1 have great variation in the color components thereof, such that a stronger filter with larger weights is selected to interpolate the video data, so as to enhance the neighboring pixels having higher relation to the target pixel P. Then, a difference between the luminances of the pixels P and P1 is calculated and determined whether smaller than a second threshold (S306).

If the difference between the luminances of the pixels P and P1 is smaller than the second threshold, a full left enhancing filter or a full right enhancing filter is used to convert the video data (S308). To be specific, if the differences between each two of the pixels P_3, P_2, P_1, and P are all smaller than a fifth threshold, the full left enhancing filter is used to convert the video data, and otherwise the full right enhancing filter is used to convert the video data.

If the difference between the luminances of the pixels P and P1 is determined not smaller than the second threshold, a center-to-left enhancing filter or a center-to-right enhancing filter is used to convert the video data (S310). To be specific, if the difference between the luminances of the pixels P and P1 is determined not smaller than the second threshold, a variation of the luminances among the pixels P_2 to P and a variation of the luminances among the pixels P to P2 are calculated and compared with each other so to determine whether to use the center-to-left enhancing filter or the center-to-right enhancing filter to convert the video data. If the variation of the luminances among the pixels P_2 to P is smaller than the variation of the luminances among the pixels P to P2, then the center-to-left enhancing filter is used to convert the video data, and otherwise the center-to-right enhancing filter is used to convert the video data.

On the other hand, in the step of S304, if the difference between the color components of the pixels P and P_1 is not larger than the first threshold, then a difference between the luminances of the pixels P and P_1 or the pixels P and P1 is calculated and determined whether larger than a third threshold (S312).

If the difference is larger than the third threshold, then a difference between a variation of the luminances among pixels P_2 to P and a variation of the luminances among pixels P to P2 is calculated and determined whether larger than a forth threshold (S314).

If the difference between the two variations is larger than the forth threshold, then the center-to-left enhancing filter or the center-to-right enhancing filter is used to convert the video data (S316). To be specific, in the step S316, the variation of the luminances among the pixels P_2 to P and the variation of the luminances among the pixels P to P2 are calculated and compared with each other so to determine whether to use the center-to-left enhancing filter or the center-to-right enhancing filter to convert the video data. If the variation of the luminances among the pixels P_2 to P is smaller than the variation of the luminances among the pixels P to P2, then the center-to-left enhancing filter is used to convert the video data, and otherwise the center-to-right enhancing filter is used to convert the video data.

If the difference between the two variations is not larger than the forth threshold, then the center-to-left loosing filter or the center-to-right loosing filter is used to convert the video data (S318). To be specific, in the step S318, the variation of the luminances among the pixels P_1 to P and the variation of the luminances among the pixels P to P1 are calculated and compared with each other so to determine whether to use the center-to-left loosing filter or the center-to-right loosing filter to convert the video data. If the variation of the luminances among the pixels P_1 to P is smaller than the variation of the luminances among the pixels P1 to P, then the left loosing filter is used to convert the video data, and otherwise the right loosing filter is used to convert the video data.

Finally, in the step S312, if the difference between the luminances of the pixels P and P_1 or the pixels P and P1 is not larger than the third threshold, a central averaging filter is used to convert the video.

To sum up, the present invention provides a method for adaptively selecting filters to interpolate video data, in which the difference among the color components of neighboring pixels are compared first so as to select stronger filter to interpolate the video data. The difference among the luminances of neighboring pixels are compared next so as to select center enhancing filter to interpolate the video data. In the conditions that cannot be concluded by the comparison of color components and luminance, a central averaging filter is used to interpolate the video data. Accordingly, an appropriate filter can be adaptively assigned to interpolate the pixels in the areas with different variation, so as to remove or reduce the color blurs, such that the interpolated color components can be accepted by human eyes more easily.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for adaptively selecting filters to interpolate video data, comprising:
    receiving the video data encoded by a 4:2:2 sampling format;
    adaptively selecting filters to convert the color components in the video data to a 4:4:4 sampling format based on differences of luminance and color components among a pixel P, a pixel P_1 on the left of the pixel P, a pixel P_2 on the left of the pixel P_1, a pixel P_3 on the left of the pixel P_2, a pixel P1 on the right of the pixel P, a pixel P2 on the right of the pixel P1, and a pixel P3 on the right of the pixel P2 in the video data, comprising:
    determining whether a difference between the color components of the pixels P1 and P_1 is larger than a first threshold;
    if larger than the first threshold, determining whether a difference between the luminances of the pixels P and P1 is smaller than a second threshold;
    if smaller than the second threshold, using a full left enhancing filter or a full right enhancing filter to convert the video data;
    if not smaller than the second threshold, using a center-to-left enhancing filter or a center-to-right enhancing filter to convert the video data;
    if not larger than the first threshold, determining whether a difference between the luminances of the pixels P and P_1 or the pixels P and P1 is larger than a third threshold;
    if larger than the third threshold, determining whether a difference between a variation of the luminances among pixels P_2 to P and a variation of the luminances among pixels P to P2 is larger than a forth threshold;
    if larger than the forth threshold, using the center-to-left enhancing filter or the center-to-right enhancing filter to convert the video data;
    if not larger than the forth threshold, using a center-to-left loosing filter or a center-to-right loosing filter to convert the video data; and
    if not larger than the third threshold, using a central averaging filter to convert the video.

2. The method for adaptively selecting filters to interpolate video data according to claim 1, the step of using the full left enhancing filter or the full right enhancing filter to convert the video data comprises:
    if the differences between each two of the pixels P_3, P_2, P_1, and P are all smaller than a fifth threshold, using the full left enhancing filter to convert the video data; and
    if the differences between each two of the pixels P, P1, P2, and P3 are not all smaller than the fifth threshold, using the full right enhancing filter to convert the video data.

3. The method for adaptively selecting filters to interpolate video data according to claim 1, the step of using the center-to-left enhancing filter or the center-to-right enhancing filter to convert the video data comprises:
    if a variation of the luminances among the pixels P_2 to P is smaller than a variation of the luminances among the pixels P to P2, using the center-to-left enhancing filter to convert the video data; and
    if a variation of the luminance component among pixels P2 to P is smaller than a variation of the luminance component among the pixels P_2 to P, using the center-to-right enhancing filter to convert the video data.

4. The method for adaptively selecting filters to interpolate video data according to claim 1, the step of using a center-to-left loosing filter or a center-to-right loosing filter to convert the video data comprises:
    if a variation of the luminances among the pixels P_1 to P is smaller than a variation of the luminances among the pixels P1 to P, using the center-to-left loosing filter to convert the video data; and
    if a variation of the luminances among the pixels P1 to P is smaller than a variation of the luminances among the pixels P_1 to P, using the center-to-right loosing filter to convert the video data.

5. The method for adaptively selecting filters to interpolate video data according to claim 1, the step of converting the video data from the 4:2:2 sampling format to the 4:4:4 sampling format comprises:
    calculating a summation of the pixels P_3, P_1, P1, P3 respectively multiplied by a corresponding weight of the filter and dividing the same by a summation of the weights so as to obtain the color component of the pixel P.

6. The method for adaptively selecting filters to interpolate video data according to claim 5, wherein the weights of the fill left enhancing filter corresponding to the pixels P_3, P_1, P1, P3 are 1, 7, 0, 0, respectively.

7. The method for adaptively selecting filters to interpolate video data according to claim 5, wherein the weights of the fill right enhancing filter corresponding to the pixels P_3, P_1, P1, P3 are 0, 0, 7, 1, respectively.

8. The method for adaptively selecting filters to interpolate video data according to claim 5, wherein the weights of the center-to-left enhancing filter corresponding to the pixels P_3, P_1, P1, P3 are 0, 7, 1, 0, respectively.

9. The method for adaptively selecting filters to interpolate video data according to claim 5, wherein the weights of the center-to-right enhancing filter corresponding to the pixels P_3, P_1, P1, P3 are 0, 1, 7, 0, respectively.

10. The method for adaptively selecting filters to interpolate video data according to claim 5, wherein the weights of the center-to-left loosing filter corresponding to the pixels P_3, P_1, P1, P3 are 0, 3, 1, 0, respectively.

11. The method for adaptively selecting filters to interpolate video data according to claim 5, wherein the weights of the center-to-right loosing filter corresponding to the pixels P_3, P_1, P1, P3 are 0, 1, 3, 0, respectively.

12. The method for adaptively selecting filters to interpolate video data according to claim 5, wherein the weights of the central averaging filter corresponding to the pixels P_3, P_1, P1, P3 are 0, 1, 1, 0, respectively.

* * * * *